(12) United States Patent
Brown et al.

(10) Patent No.: US 12,370,097 B2
(45) Date of Patent: Jul. 29, 2025

(54) RETROFITTABLE FRAME FOR A VEHICLE

(71) Applicant: FOREST RIVER BUS, LLC, Goshen, IN (US)

(72) Inventors: David Brown, Northville, MI (US); James Ronald, Commerce Township, MI (US)

(73) Assignee: FOREST RIVER BUS, LLC, Goshen, IN (US)

( * ) Notice: Subject to any disclaimer, the term of this patent is extended or adjusted under 35 U.S.C. 154(b) by 413 days.

(21) Appl. No.: 17/821,031

(22) Filed: Aug. 19, 2022

(65) Prior Publication Data

US 2024/0058185 A1    Feb. 22, 2024

(51) Int. Cl.
*A61G 3/06*    (2006.01)
*A61G 3/08*    (2006.01)
*B60J 5/04*    (2006.01)
*B62D 47/02*   (2006.01)

(52) U.S. Cl.
CPC ........... *A61G 3/061* (2013.01); *A61G 3/0808* (2013.01); *B60J 5/0412* (2013.01); *B60J 5/0469* (2013.01); *B60J 5/0486* (2013.01); *B60J 5/0497* (2013.01); *B62D 47/02* (2013.01)

(58) Field of Classification Search
CPC ....... B62D 47/02; B60J 5/0469; B60J 5/0486; B60J 5/0497; B60J 5/0412; A61G 3/061; A61G 3/0808; E06B 1/52; E06B 1/56; E06B 1/347
See application file for complete search history.

(56) References Cited

U.S. PATENT DOCUMENTS

| | | | |
|---|---|---|---|
| 1,720,336 A * | 7/1929 | Ledwinka | B60J 5/0402 |
| | | | 296/151 |
| 4,251,179 A | 2/1981 | Thorley | |
| 5,180,275 A | 1/1993 | Czech et al. | |
| 9,789,922 B2 | 10/2017 | Dosenbach et al. | |
| 10,835,428 B2 | 11/2020 | MacPherson et al. | |
| 2003/0132049 A1 | 7/2003 | Kurttila et al. | |
| 2014/0356118 A1* | 12/2014 | Friedlinghaus | A61G 3/062 |
| | | | 414/523 |

FOREIGN PATENT DOCUMENTS

| | | | | |
|---|---|---|---|---|
| DE | 4135911 A1 | 5/1993 | | |
| DE | 102015112942 B4 * | 1/2021 | ............. | B60P 3/007 |
| GB | 2451556 A | 2/2009 | | |
| JP | 6020240 B2 * | 11/2016 | | |

\* cited by examiner

*Primary Examiner* — Daniel J Colilla
(74) *Attorney, Agent, or Firm* — Taft Stettinius & Hollister LLP; Stephen F. Rost

(57) ABSTRACT

A vehicle door assembly in a vehicle having a body-in-white, the body-in-white having a rear wheel well, the vehicle door assembly comprising a door frame, the door frame having an aperture therein, the frame extending into the rear wheel-well.

18 Claims, 8 Drawing Sheets

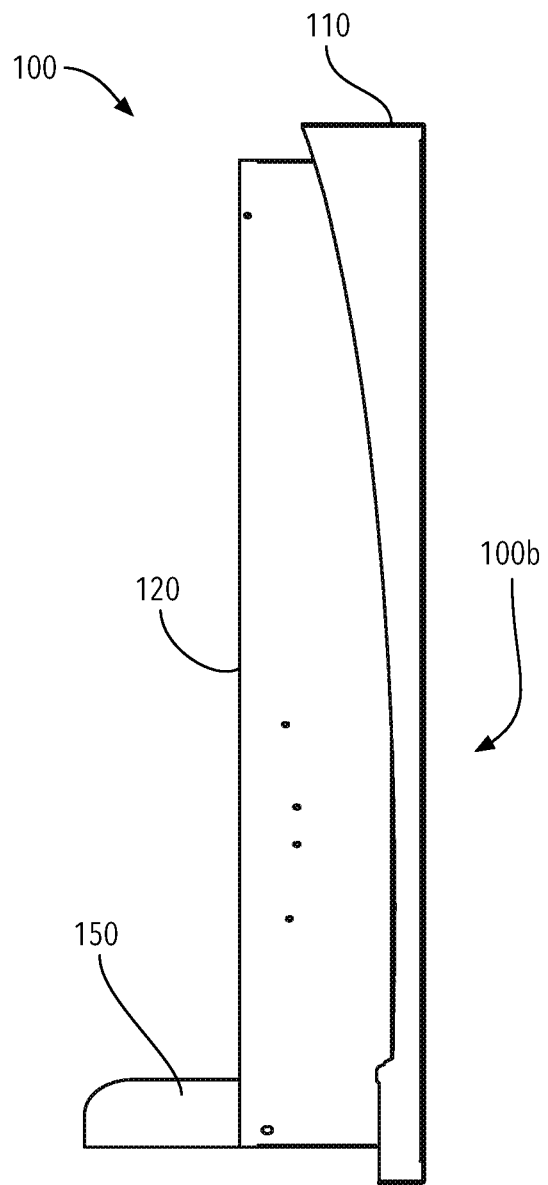
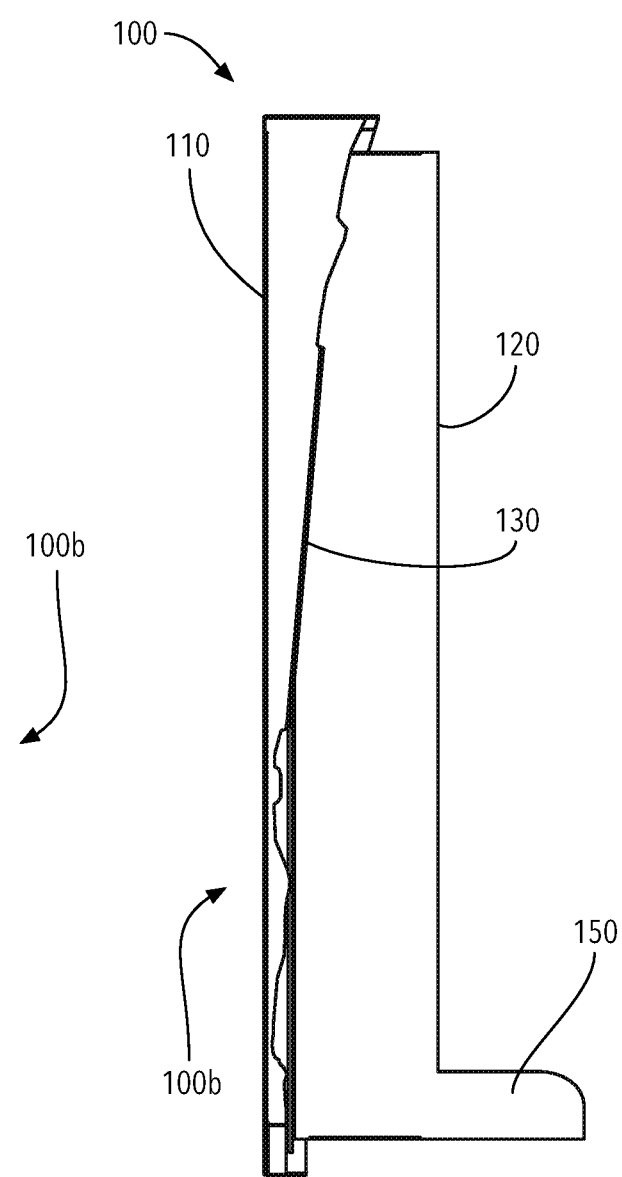
FIG. 4A
FIG. 4B

RETROFITTABLE FRAME FOR A VEHICLE

FIELD

The present invention relates to a frame arranged within a vehicle, specifically a frame that protrudes into a rear wheel well.

BACKGROUND

Handicap accessible vehicles are well known in the art. These vehicles normally require intensive, and/or specialized modifications in order to accommodate a wheelchair-bound individual, from the entry into the vehicle and being seated within the vehicle. In many prior attempts, these modifications have been made to various areas of a vehicle, such as the front door, the side of vehicle in-between the front wheel well and the rear wheel well, and the rear facing surface of the vehicle.

In these prior attempts, the modifications, which all include the adaptation of a doorway which allows a wheelchair lift to pass through, have been located away from important functional structures of the vehicle. Specifically, these prior attempts have all located these doorways away from the existing wheel-wells of the vehicles—requiring more intensive modifications to the vehicles and necessarily, more expense.

An example of a modified vehicle is disclosed in U.S. Pat. No. 9,789,922. The '922 patent discloses a vehicle which has been modified to include a second passenger side door coupled to the unibody frame through a mechanical linkage. The second passenger side door is arranged between the front wheel well and the rear wheel well. The opening of the second passenger door is modified so that it is wide enough to include a ramp assembly, which provides rolling access of a wheelchair from a ground surface to the interior.

Thus, there is a long felt need for a vehicle doorway that is inexpensive and requires less intensive modification to an existing vehicle, specifically there is a need for a doorway that partially protrudes into an existing vehicle's wheel well without effecting the safety or performance of the vehicle.

There is also a long felt need for a vehicle doorway frame that is arranged proximate the rear end of a vehicle and is open to the curbside of a street, where the doorway frame partially protrudes into the rear wheel well of the vehicle.

There is also a further long felt need for a vehicle doorway frame that is arranged proximate the rear end of a vehicle and is open to the curbside of a street, where the doorway frame partially protrudes into the rear wheel well of the vehicle, where the doorway frame is configured to allow a wheelchair lift assembly, arranged within the vehicle proximate to the doorway frame, to pass therethrough.

SUMMARY

The present invention broadly comprises a vehicle door assembly in a vehicle having a body-in-white, the body-in-white having a rear wheel well, the vehicle door assembly comprising a door frame, the door frame having an aperture therein, the frame extending into the rear wheel-well. Where the aperture extends into said the wheel-well. Where the rear wheel-well has a rearward arcuate section and a forward arcuate section and the frame extends into the rearward arcuate section of the rear wheel-well. Where the door frame further includes a mounting frame, the mounting frame fixedly secured within the body-in-white, a secondary frame, the secondary frame fixedly secured within the mounting frame.

The door frame of the present invention also generally comprises a mounting frame, the mounting frame fixedly secured within the body-in-white, the mounting frame having an internal end the an external end, the mounting frame have an extension member extending from an external perimeter of the external end, the extension member having a lip extending therefrom, and a secondary frame, the secondary frame fixedly secured to the mounting frame, the secondary frame includes an internal end and an external end, the secondary frame having a shoulder extending from an internal perimeter proximate the external end, the lip of the mounting frame arranged to abut the shoulder when the secondary frame is engaged to the mounting frame.

The secondary door frame of the present invention also generally comprises an edge extending from the internal end, the edge arranged to rest on an external surface of the body-in-white when the secondary frame is engaged to the mounting frame within the body-in-white, the secondary frame also includes a flange, the flange extending from the secondary frame, the flange further arranged to accept a plurality of bolts to secure the secondary frame to the body-in-white. The secondary frame further includes a cutout arranged on a lower section of said secondary frame, wherein said cutout is disposed within said wheel-well and further arranged to provide clearance of a wheel within said wheel-well.

The present invention also generally comprises a frame aperture disposed within the wheel-well, the mounting frame including a supporting member extending therefrom, the supporting member secured to an external perimeter of the frame aperture.

The present invention may also generally comprise a vehicle door assembly in a vehicle having a body-in-white, the body-in-white having a rear wheel well, the vehicle door assembly including a door frame, comprising a mounting frame, the mounting frame fixedly secured within the body-in-white and further arranged to extend into a frame aperture of the rear wheel-well, a supporting member extending from the mounting frame, the supporting member secured to an external perimeter of the frame aperture, and a secondary frame, the secondary frame arranged to engage the mounting frame.

The mounting frame of the present invention may further comprise an internal end, an external end, an extension member extending from an external perimeter of the external end, a lip extending from the extension member.

The secondary frame of the present invention may further comprise an internal end, an external end, a shoulder extending from an internal perimeter proximate the external end of, and where the lip of the mounting frame arranged to abut the shoulder when the secondary frame is engaged to the mounting frame.

The secondary frame of the present invention may generally include an edge extending from the internal end, the edge arranged to rest on an external surface of the body-in-white when the secondary frame is engaged to the mounting frame within the body-in-white.

The secondary frame of the present invention may still further comprise a flange, the flange extending from the secondary frame, the flange further arranged to accept a plurality of bolts to secure the secondary frame to the body-in-white, and a cutout arranged on a lower section of the secondary frame, wherein the cutout is disposed within the wheel-well and further arranged to provide clearance of a wheel within the wheel-well.

A general object of this invention is to provide a vehicle doorway that is inexpensive and requires less intensive modification to an existing vehicle, specifically the doorway is arranged to partially protrudes into the existing vehicle's wheel well without affecting the safety or performance of the vehicle.

Another object of this invention is to provide a vehicle doorway frame that is arranged proximate the rear end of a vehicle and is open to the curbside of a street, where the doorway frame partially protrudes into the rear wheel well of the vehicle.

A further object of this invention is to provide a vehicle doorway frame that is arranged proximate the rear end of a vehicle and is open to the curbside of a street, where the doorway frame partially protrudes into the rear wheel well of the vehicle, where the doorway frame is configured to allow a wheelchair lift assembly, arranged within the vehicle proximate to the doorway frame, to pass therethrough.

An even further object of the present invention is to provide a vehicle doorway that is partially arranged to protrude into a wheel-well of an existing vehicle through a cut-out, or aperture within the wheel-well, where the frame includes a support member arranged to engage and cover the aperture within the wheel-well and provides for clearance of a wheel disposed within the wheel-well, and the frame being further arranged to accommodate axial and radial movement of the wheel within the wheel-well due to the existing vehicle's suspension.

These and other objects, features, and advantages of the present invention will become readily apparent upon a review of the following detailed description of the invention, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 4A is a left-side view of the invention shown in FIG. 3

FIG. 4B is a right-side view of the invention shown in FIG. 3;

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims.

It should be appreciated that directions XD1, XD2, YD1, YD2, ZD1, and ZD2, referenced in the appending description of the figures, are directional references to locate components of the present invention and are not intended to be restrictive with respect to the scope of the appended claims.

It should be appreciated that the term "body-in-white" is meant to mean a vehicle frame, that is, a vehicle frame that has been joined together before painting and before the motor, chassis sub-assemblies, or trim (glass, door locks/handles, seats, upholstery, electronics, etc.) have been integrated into the frame.

It should also be appreciated that the term "wheel-well" is meant to mean a recess within a body-in-white, or a completely assembly vehicle frame, in which a later-installed wheel is located.

Figure 1:
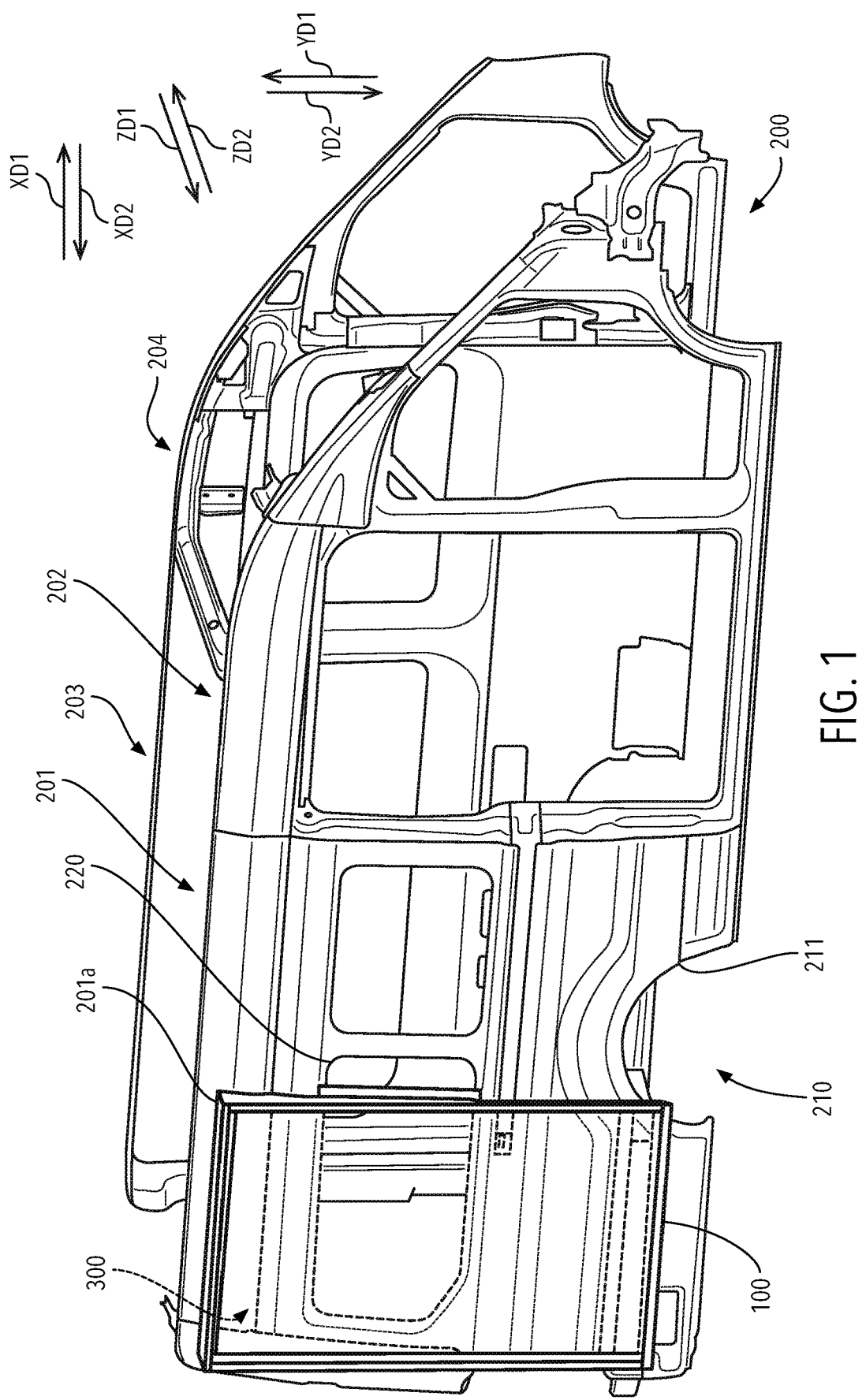
FIG. 1 is a perspective view of the present invention within a body-in-white of a vehicle.

Adverting now to the figures, FIG. 1 is a perspective view of the present invention within a body-in-white of a vehicle. Body-in-white 200 is preferably for van-type vehicles but may alternatively be configured for sport utility vehicles (SUVs), cross-over vehicles, and the like. In a preferred embodiment, body-in-white 200 is for a Ford® Transit Van, which may include the 150 Crew, the 150 Cargo, the 250 Crew, the 250 Cargo, the 350 Passenger, the 350 Crew, or the 350 Cargo model. It should be appreciated that vehicle door assembly 100, shown within body-in-white 200, may be adaptably configured to fit a plurality of different vehicle makes and/or models.

Body-in-white 200 is generally comprised of four (4) sections: rear passenger-side section 201; front passenger-side section 202; rear driver-side section 203; and, front driver-side section 204. In a preferred embodiment, vehicle door assembly 100 is configured to be installed within rear passenger-side section 201, but alternative configurations may be adapted to be installed within sections 202, 203, and 204. Vehicle door assembly 100 is arranged to fit within removed section 300 of rear passenger-side section 201—when section 300 is cut-away, assembly aperture 201a (created from the removal of section 300) may accept vehicle door assembly 100 therein. When installed within rear passenger-side section 201, vehicle door assembly 100 will partially protrude into wheel-well 210, specifically a lower portion of assembly 100 protrudes through wall 211 of wheel-well, that is, a section of wall 211 is removed to allow a lower portion of assembly 100 to be seated therein.

Figure 2:
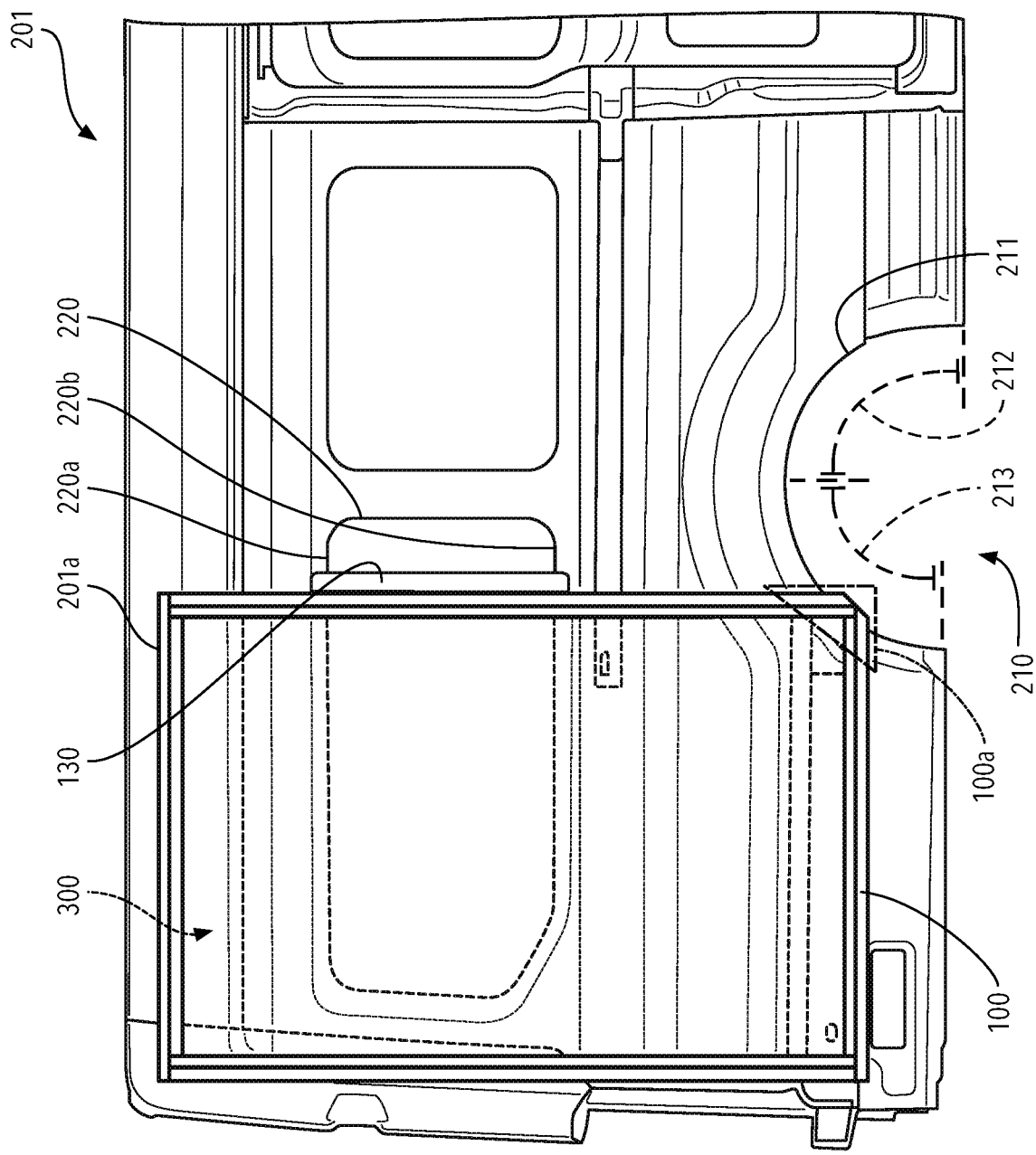
FIG. 2 is a front view of the illustration in FIG. 1.

FIG. 2 is a front view of rear passenger-side section 201 of body-in-white 200 within vehicle door assembly 100 installed therein. Vehicle door assembly 100 is preferably constructed of A36 steel, stainless steel, abs plastic, and/or a combination thereof. Wall 211 of wheel-well 210 is made up of forward arcuate section 212 and rearward arcuate section 213. Lower portion 100a of assembly 100 is arranged to partially protrude into wheel-well 210. Specifically, lower portion 100a protrudes into rearward arcuate section 213 of wall 211. Vehicle door assembly 100 also includes flange 130 extending therefrom. Flange 130 provides an additional surface for securing assembly 100 within aperture 201a where flange 130 may be welded or bolted, to the external surface of rear passenger-side section 201. In a preferred embodiment flange 130 is arranged to be mounted over window aperture 220 and attached to the external surface of rear passenger-side section 201, where the respective ends of flange 130 extend past upper edge 220a and lower edge 220b of window aperture 220.

Figure 3:
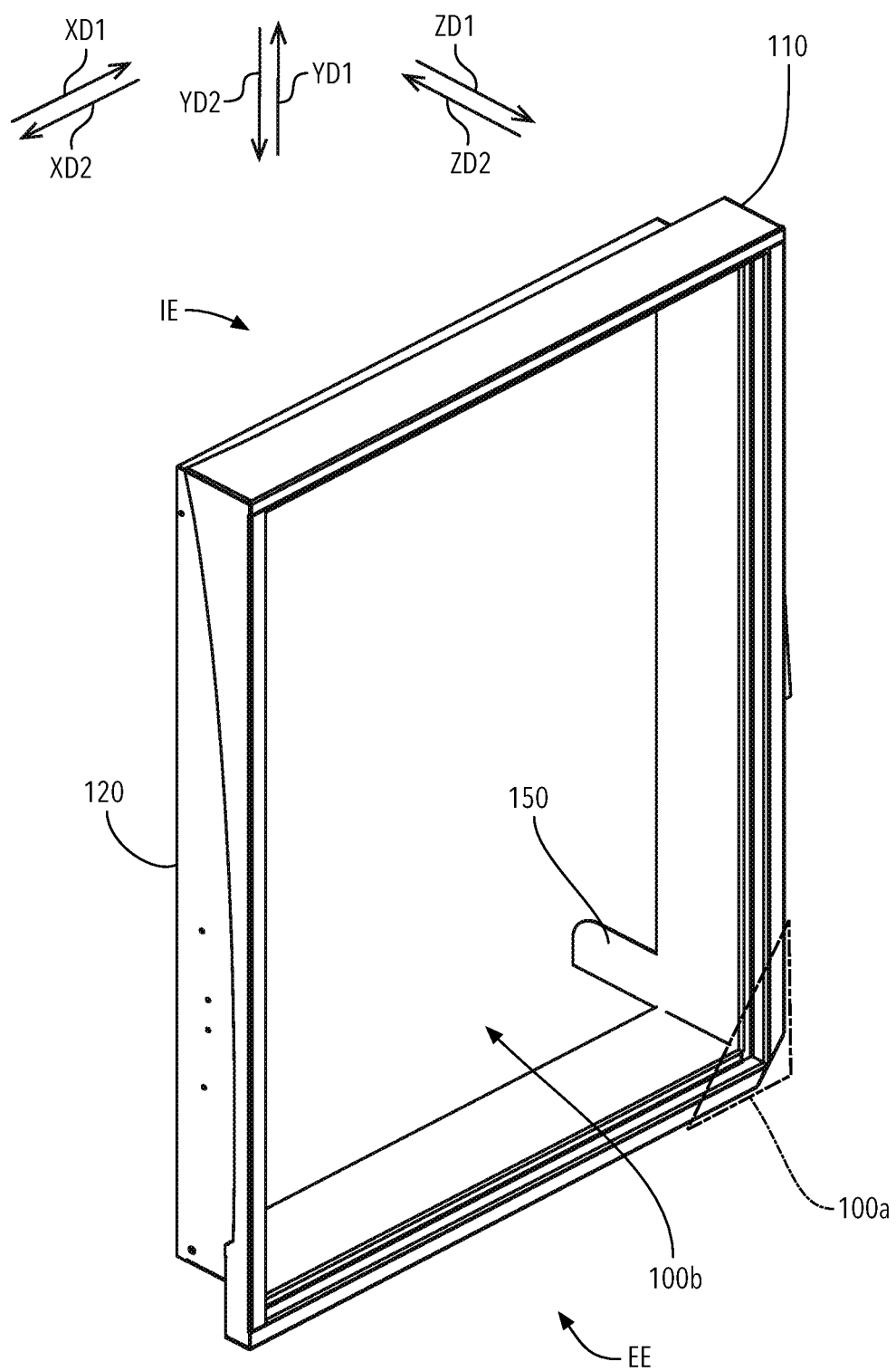
FIG. 3 is a perspective view of the present invention.
Figure 5A:
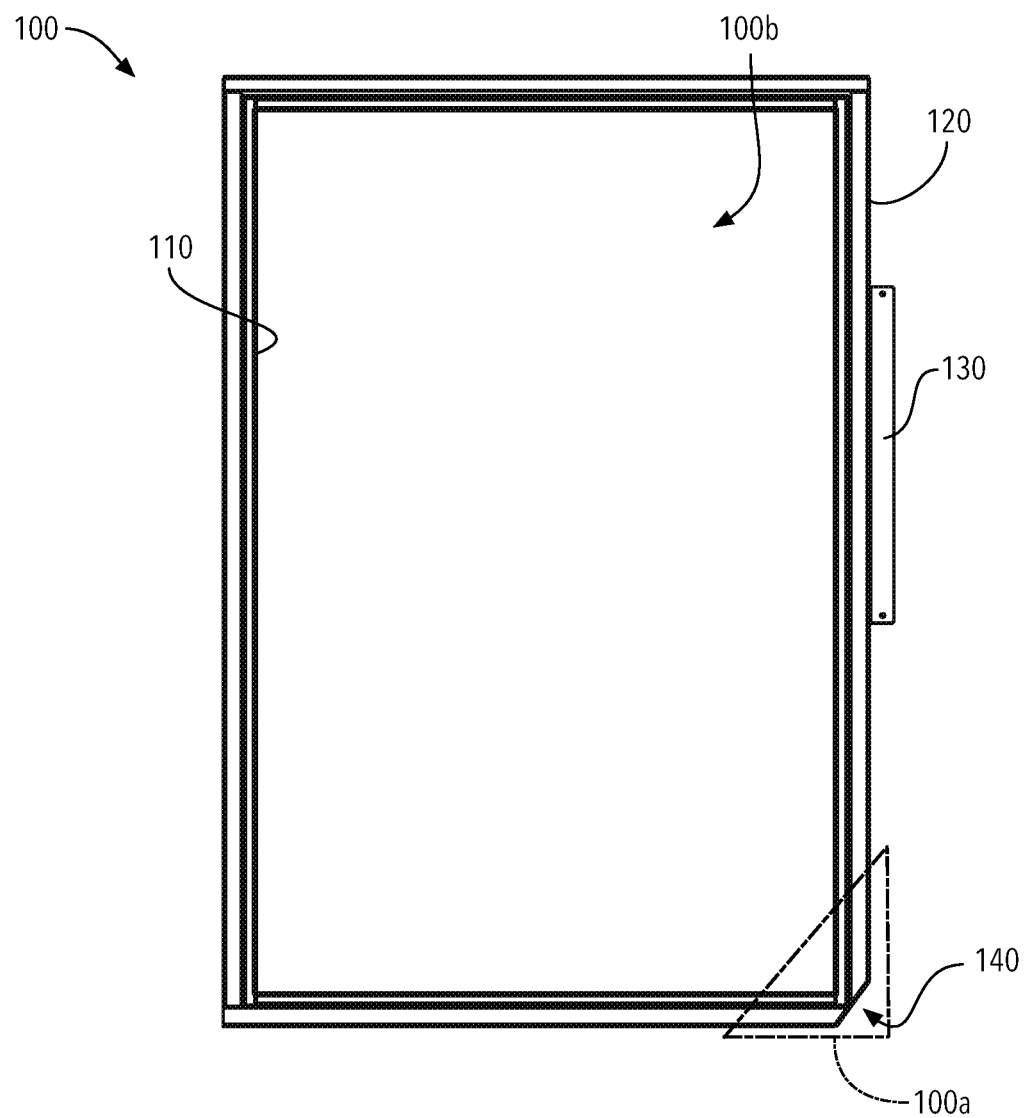
FIG. 5A is a front view of the invention shown in FIG. 3.
Figure 5B:
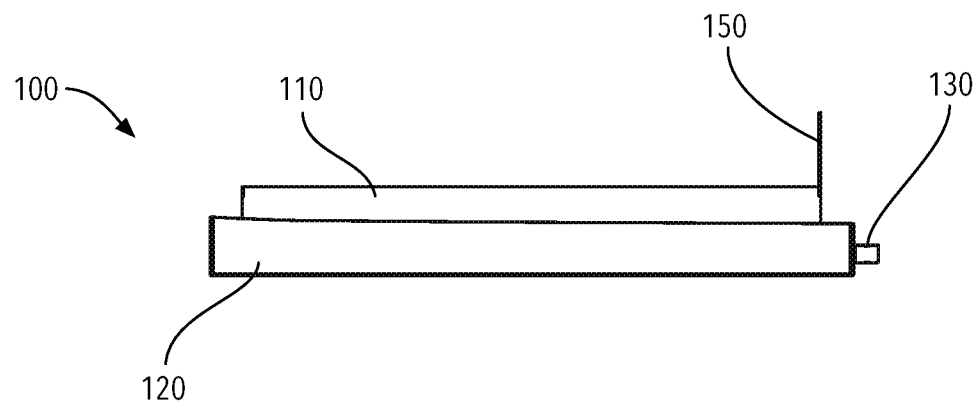
FIG. 5B is a top plan view of the invention shown in FIG. 3.

The following description should be taken in view of FIGS. 3 through 5B. FIG. 3 illustrates a perspective view of vehicle door assembly 100. FIG. 4A illustrates a left-side view of vehicle door assembly 100. FIG. 4B illustrates a right-side view of vehicle door assembly 100. FIG. 5A illustrates a front view of vehicle door assembly 100. FIG. 5B illustrates a top plan view of vehicle door assembly 100.

In a preferred embodiment vehicle door assembly 100 comprises mounting frame 120 and secondary frame 110, where secondary frame 110 is arranged to be secured to mounting frame 120, mounting frame 120 primarily is arranged within body-in-white 200 (shown in FIGS. 1 and 2), and secondary frame 110 is primarily arranged to be secured to mounting frame 120 and secured on an external surface of body-in-white 200 (shown in FIGS. 1 and 2). Secondary frame 110 may be secured to mounting frame 120 via a plurality of bolts, or other suitable attachment means.

Secondary frame 110 and mounting frame 120 of vehicle door assembly 100 include cutout 140. Cutout 140 is arranged on lower portion 110a of vehicle door assembly 100, that is, cutout 140 will be positioned within wheel-well 210 (as shown in FIGS. 1 and 2). Cutout 140 (shown in FIG. 5A) specifically removes the angled intersection formed at lower portion 100a of secondary frame 110 and mounting frame 120 to ensure that the respective frames will not contact a wheel that is within the wheel-well, that is, cutout 140 provides for necessary wheel clearance—ensuring safety and proper function of the vehicle during operation.

Secondary frame 110 includes flange 130, which extends from an outside surface of secondary frame 110 in direction XD1 on the same side of secondary frame 110 as lower portion 110a. Flange 130 is specifically a window flange, whereas flange 130 is arranged to be placed over window aperture 220 within the body-in-white (shown in FIGS. 1 and 2). Flange 130 assists in locating and bolting secondary frame 110 into is preferred position—connected to mounting frame 120 and secured to the outer surface of the body-in-white.

Mounting frame 120 includes supporting member 150, which is arranged in lower portion 110a of vehicle door assembly 100 and is further arranged to extend in direction ZD2. Support member 150 provides additional stability for vehicle door assembly 100 when installed within the body-in-white. Supporting member 150 is shown and discussed in greater detail in view of FIG. 8, infra.

Figure 6:
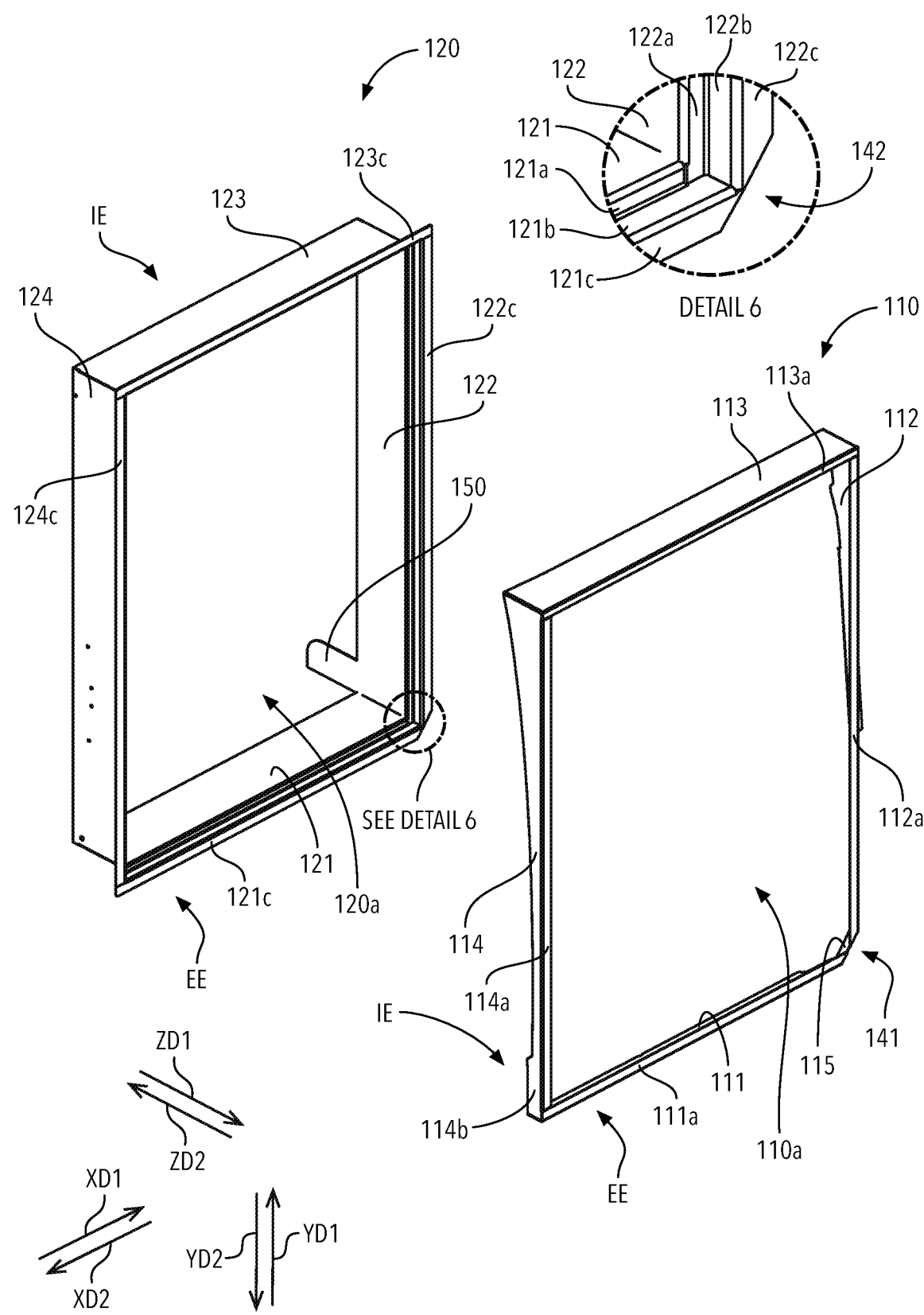
FIG. 6 is an exploded perspective view of the invention shown in FIG. 3.
Figure 7:
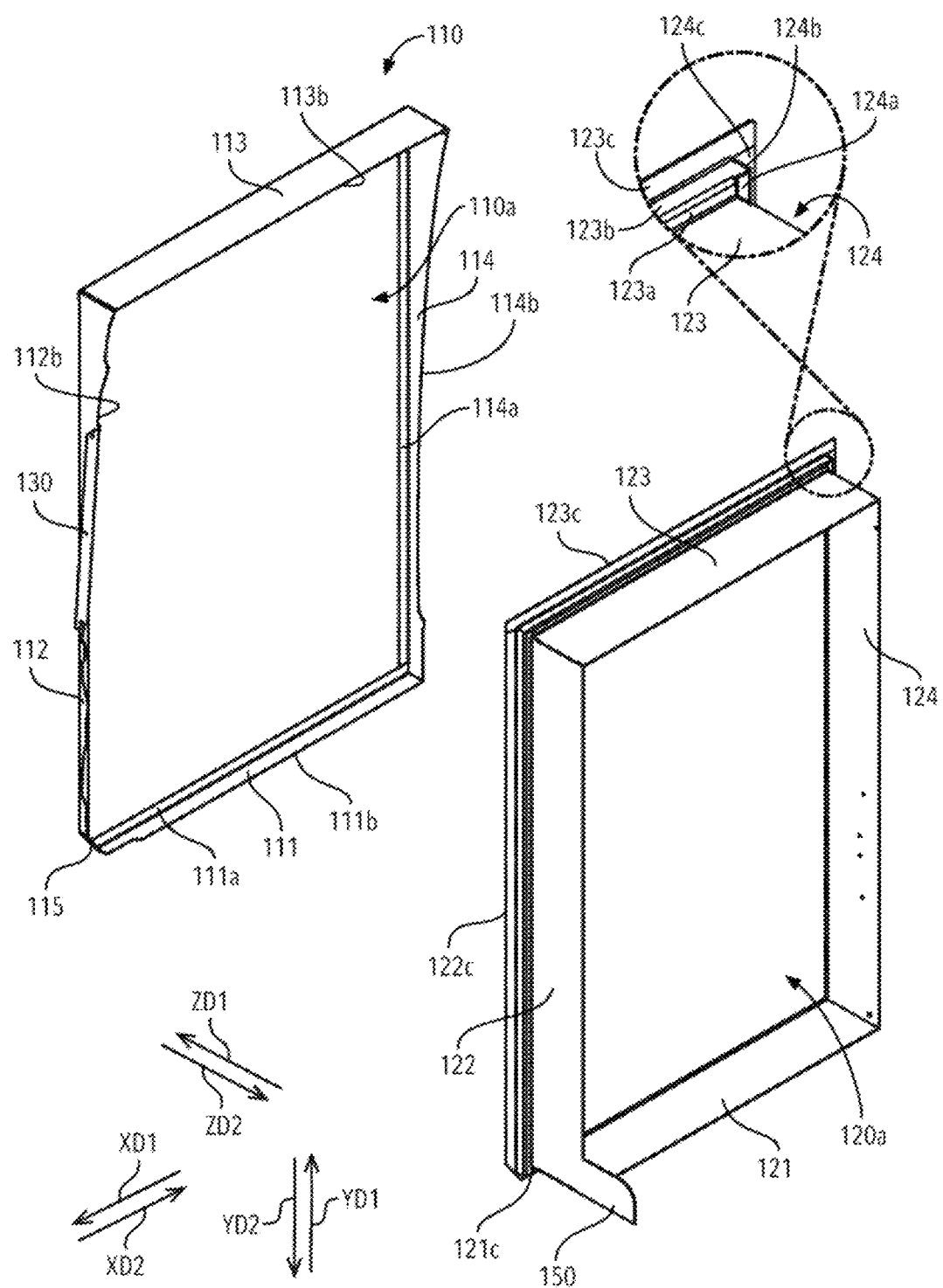
FIG. 7 is another exploded perspective view of the invention shown in FIG. 3.

The following description should be taken in view of FIGS. 6 and 7 which generally illustrate different exploded perspective views of mounting frame 120 and secondary frame 110, which collectively comprise vehicle door assembly 100. Secondary frame 110 generally includes frame members 111, 112, 113, and 114 which are fixedly secured at their respective terminating ends—forming a singular and fixed frame. Frame members 111, 112, 113, 114, and 115 form aperture 110a of secondary frame 110. Frame member 115 connects frame members 111 and 112 on an angle. Frame member 115 provides for cutout 141 of secondary frame. Extending from frame members 111, 112, 113, and 114, into aperture 110a are shoulder members 111a, 112a, 113a, and 114a, respectively. Shoulder members 111a, 112a, 113a, and 114a are arranged to abut and be secured to mounting frame 110 by a plurality of different means, e.g., bolts, welding, and/or the like. Shoulder members 111a, 112a, 113a, and 114a collectively form a mounting shoulder of secondary frame 110. Frame members 111, 112, 113, and 114 also include a mounting edge collectively comprised of mounting edges 111b, 112b, 113b, and 114b. The mounting edge of secondary frame 110 is arranged to have a configuration that will contour to the outside surface of a body-in-white—such that secondary frame 110 is preferably arranged to have a flush abutment with the outside surface of a body-in-white when installed.

Mounting frame 120 generally includes frame members 121, 122, 123, and 124 which are fixedly secured at their respective terminating ends—forming a singular and fixed frame. The fixed frame (frame members 121, 122, 123, and 124) of mounting frame 120 includes a substantially L-shaped extension extending therefrom. The L-shaped extension is comprised of first extension members 121a, 122a, 123a, and 124a—extending from frame members 121, 122, 123, and 124, respectively—and second extension members 121b, 122b, 123b, and 124b—extending from first extension members 121a, 122a, 123a, and 124a, respectively. Extending from the L-shaped extension are lip members 121c, 122c, 123c, and 124c, collectively forming a mounting lip of mounting frame 120. Lip members 121c and 122c are arranged to form cutout 142 of mounting frame.

When secondary frame 110 is secured to mounting frame 120, shoulder members 111a, 112a, 113a, and 114a of secondary frame 110 will abut lip members 121c, 122c, 123c, and 124c of mounting frame 120, respectively.

Figure 8B:
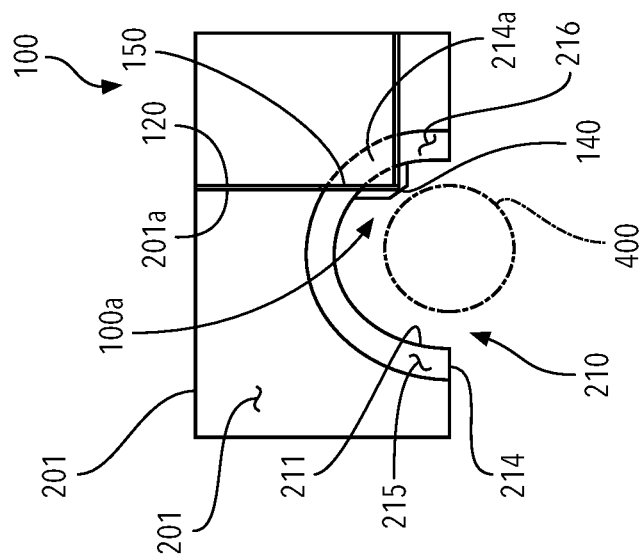
FIG. 8A is a perspective view of a section of the body-in-white of a vehicle with the invention shown in FIG. 3 therein; and, FIG. 8B is a side view of a portion of rear passenger-side section 201 illustrating supporting member 150 attached to wheel-well liner 214.
Figure 8A:
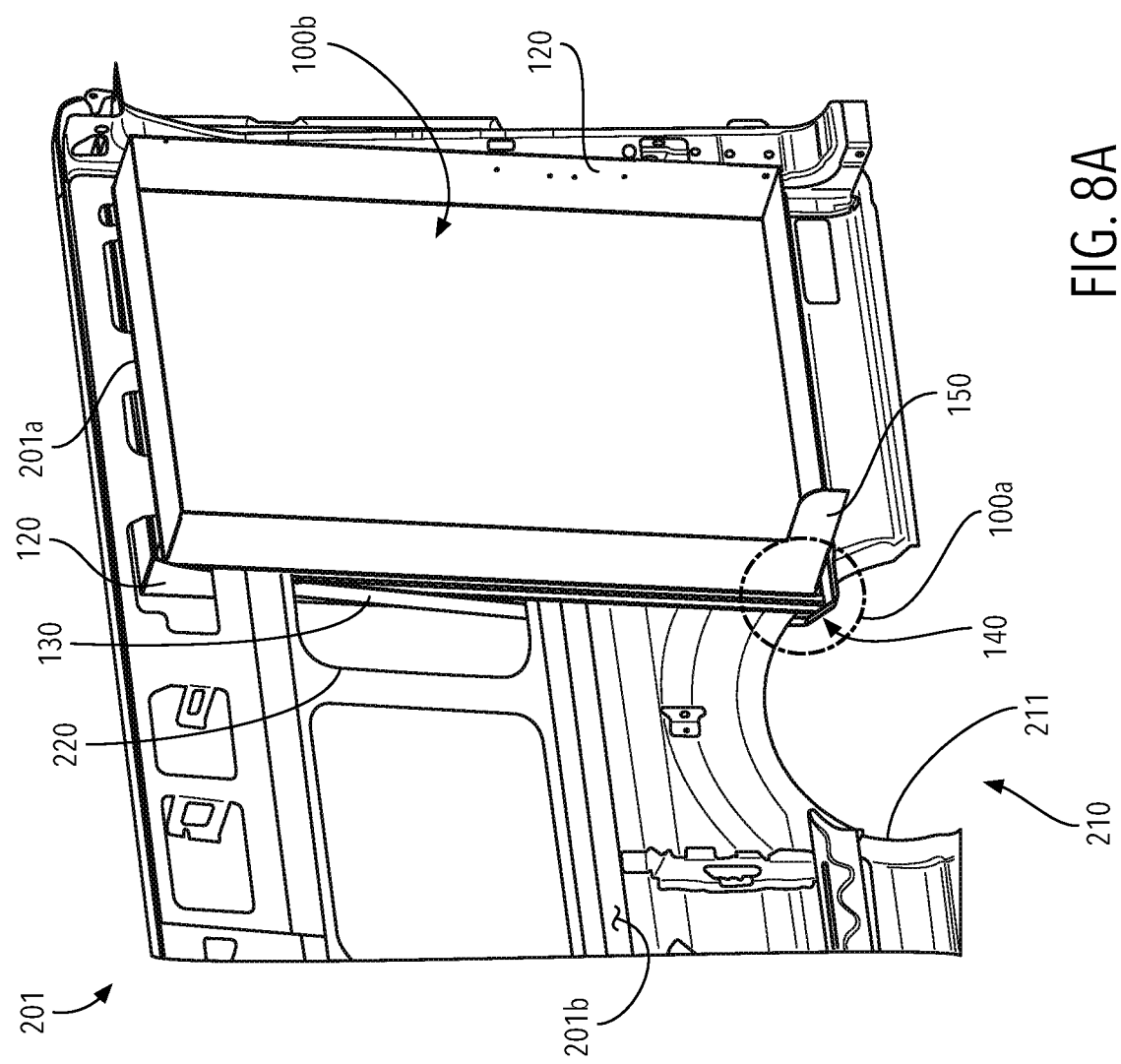

The following description should be taken in view of FIGS. 8A and 8B. FIG. 8A is a perspective view of rear passenger-side section 201 of body-in-white 200 with vehicle door assembly 100 installed therein and FIG. 8B is a side view of a portion of rear passenger-side section 201 illustrating supporting member 150 attached to wheel-well liner 214.

When rear passenger-side section 201 of body-in-white 200 is being assembled after vehicle door assembly 100 is installed, wheel-well liner 214 is attached to the internal surface of rear passenger-side section 201 around the external perimeter of wheel-well wall 211. A representative example of wheel-well liner 214, can by found at: accessories.ford.com. Wheel-well liner 214 includes forward arcuate section 215 and rearward arcuate section 216. Rearward arcuate section 216 accommodates supporting member 150 on either, an external surface, that is, support member 150 is secured thereon, an internal surface, or covering an aperture (removed section 214A of wheel-well wall 211 and wheel-well liner 214). It should be appreciated that supporting member 150 may have alternative configurations, e.g., curvatures, bends, etc., to allow an efficient securement to rearward arcuate section 216 of wheel-well liner 214. Supporting member 150 may be bolted on, or welded to, rearward arcuate section 216 of wheel-well liner 214, however alternative securement means are also contemplated. It should be noted that rearward arcuate section 216 of wheel-well liner 214 may have an aperture (removed section 214A of wheel-well wall 211 and wheel-well liner 214) that is arranged to fit supporting member 150 therein, thereon, or therearound, or a combination thereof, where supporting member 150 may be fixedly secured to seal the aperture, either from an internal surface (the direction into wheel-well 210) of rearward arcuate section 216 of wheel-well liner 214, or an external surface (the direction towards door assembly 100) of rearward arcuate section 216 of wheel-well liner 214. Supporting member 150 may be configured to be arranged within wheel-well 210 or outside of wheel-well 210. It should also be appreciated that lower portion 110a of vehicle door assembly 100 may be within the aperture of wheel-well liner 214—including supporting member 150, where lower portion 100a will be partially within wheel-well 211 (extending through wheel-well liner 214).

It should be noted that FIG. 8B is merely an exemplary illustration and that supporting member 150 can take a variety of different configurations to attach to wheel-well 210, wheel-well wall 211, or wheel-well liner 214, or a combination thereof. Removed section 214A of wheel-well wall 211 and wheel-well 210 allows lower section 110b of vehicle door assembly to fit into and partially protrude into wheel-well 210, such that cutout 140 will still provide clearance to wheel 400.

The following description should be taken in view of all of the aforementioned figures. Vehicle door assembly 100 is configured to accept a door within aperture 100b and may include a plurality of components to accommodate a door installation, e.g., hinges, weatherproof trim, etc. An example of the door that may be configured within vehicle door assembly 100 is a Lippert® Transit Door, Rear Exit Bus Door, Side Exit Bus Door, and/or a Bi-Fold Bus Door, found at: www.lci1.com. It should also be appreciated that the dimensions of vehicle door assembly 100 may be configurable to accommodate custom 1 doors so long as cutout 140 stills provide adequate clearance of wheel 400 within wheel-well 210. The following description should be taken in view of all of the aforementioned figures. Vehicle door assembly 100 is configured to accept a door within aperture 100b and may include a plurality of components to accommodate a door installation, e.g., hinges, weatherproof trim, etc. An example of the door that may be configured within vehicle door assembly 100 is a Lippert® Transit Door, Rear Exit Bus Door, Side Exit Bus Door, and/or a Bi-Fold Bus Door, found at: https://www.lci1.com/products/commercial-vehicle-supplier/bus-doors/. It should also be appreciated that the dimensions of vehicle door assembly 100 may be configurable to accommodate custom doors so long as cutout 140 stills provide adequate clearance of wheel 400 within wheel-well 210.

It should be appreciated that the embodiment as shown is only one of a variety of possible embodiments of the claimed invention. It should also be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

100 Vehicle door assembly
100a Lower section of assembly 100
100b Aperture of assembly 100
110 Secondary frame
110a Aperture of secondary frame 110
111 Frame member of secondary frame 110
111a Shoulder member of frame member 111
111b Mounting edge of frame member 111
112 Frame member of secondary frame 110
112a Shoulder member of frame member 112
112b Mounting edge of frame member 112
113 Frame member of secondary frame 110
113a Shoulder member of frame member 113
113b Mounting edge of frame member 113
114 Frame member of secondary frame 110
114a Shoulder member of frame member 114
114b Mounting edge of frame member 114
115 Frame member of secondary frame 110
120 Mounting frame
120a Aperture of mounting frame 120
121 Frame member of mounting frame 120
121a First extension member of frame member 121
121b Second extension member of frame member 121
121c Lip member of frame member 121
122 Frame member of mounting frame 120
122a First extension member of frame member 122
122b Second extension member of frame member 122
122c Lip member of frame member 122
123 Frame member of mounting frame 120
123a First extension member of frame member 123
123b Second extension member of frame member 123
123c Lip member of frame member 123
124 Frame member of mounting frame 120
124a First extension member of frame member 124
124b Second extension member of frame member 124
124c Lip member of frame member 124
130 Flange
140 Cutout
141 Cutout of secondary frame 110
142 Cutout of mounting frame 120
150 Supporting member
200 Body-in-white
201 Rear passenger-side section
201a Door assembly aperture
201b Internal surface of rear passenger-side section 201
202 Front passenger-side section
203 Rear drive-side section
204 Front driver-side section
210 Rear passenger-side wheel-well
211 Wall of wheel-well 210
212 Forward arcuate section of wheel-well 210
213 Rearward arcuate section of wheel-well 210
214 Well-well liner
214a Removed section of wheel-well liner 214
215 Forward arcuate section of wheel-well liner 214
216 Rearward arcuate section of wheel-well liner 214
220 Window aperture of rear passenger-side section 201
220a Upper edge of window aperture 220
220b Lower edge of window aperture 220
300 Removed section of rear passenger-side section 201
400 Wheel
XD1 Direction
XD2 Direction
YD1 Direction
YD2 Direction ZD1 Direction
ZD2 Direction

What is claimed is:

1. A vehicle door assembly in a vehicle having a body-in-white, said body-in-white having a rear wheel-well, said vehicle door assembly comprising a door frame, said door frame having an aperture therein, said door frame extending into said rear wheel-well, wherein said aperture extends into said rear wheel-well.

2. The vehicle door assembly recited in claim 1, wherein said door frame is configured to extend into a rearward arcuate section of said rear wheel-well.

3. The vehicle door assembly recited in claim 1, wherein said door frame is configured to allow a wheelchair lift assembly to pass therethrough.

4. The vehicle door assembly recited in claim 1, wherein said door frame is configured to allow a wheelchair ramp assembly to pass therethrough.

5. The vehicle door assembly recited in claim 1, further arranged to accept a door therein.

6. A vehicle door assembly in a vehicle having a body-in-white, said body-in-white having a rear wheel-well, said vehicle door assembly comprising a door frame, said door frame having an aperture therein, said door frame extending into said rear wheel-well,
wherein said door frame further comprises:
a mounting frame, said mounting frame fixedly secured within said body-in-white, said mounting frame having an internal end and an external end, said mounting frame have an extension member extending from an external perimeter of said external end, said extension member having a mounting lip extending therefrom; and,
a secondary frame, said secondary frame fixedly secured to said mounting frame, said secondary frame includes an internal end and an external end, said secondary frame having a mounting shoulder extending from an internal perimeter proximate said external end, said mounting lip of said mounting frame arranged to abut said mounting shoulder when said secondary frame is engaged to said mounting frame.

7. The vehicle door assembly recited in claim 6, wherein said secondary frame includes a mounting edge extending from said internal end, said mounting edge arranged to rest on an external surface of said body-in-white when said secondary frame is engaged to said mounting frame within said body-in-white, wherein said mounting edge is arranged to contour to said external surface of said body-in-white.

8. The vehicle door assembly recited in claim 6, wherein said wheel well includes a frame aperture, said mounting frame including a supporting member extending therefrom, said supporting member secured to an external perimeter of said frame aperture.

9. The vehicle door assembly recited in claim 6, wherein said secondary frame further comprises a flange, said flange extending from said frame, said flange further arranged to accept a plurality of bolts to secure said secondary frame to said body-in-white.

10. The vehicle door assembly recited in claim 6, further comprising a cutout arranged on a lower section of said door assembly, wherein said cutout is disposed within said wheel-well and further arranged to provide clearance of a wheel within said wheel-well.

11. The vehicle door assembly recited in claim 10, wherein said cutout comprises:
a first cutout arranged on a lower section of said mounting frame; and,
a second cutout arranged on a lower section of said secondary frame,
wherein said first cutout and said second cutout are collinearly arranged.

12. A vehicle door assembly in a vehicle having a body-in-white, said body-in-white having a rear wheel-well, said vehicle door assembly including a door frame, the door frame comprising:
a mounting frame, said mounting frame fixedly secured within said body-in-white and further arranged to extend into a frame aperture of said rear wheel-well, a supporting member extending from said mounting frame, said supporting member secured to an external perimeter of said frame aperture; and,
a secondary frame, said secondary frame arranged to engage said mounting frame.

13. The vehicle door assembly recited in claim 12, wherein said mounting frame further comprises:
an internal end;
an external end;
an extension member extending from an external perimeter of said external end;
a mounting lip extending from said extension member; and,
wherein said secondary frame further comprises:
an internal end;
an external end; and,
a mounting shoulder extending from an internal perimeter proximate said external end of, wherein said mounting lip of said mounting frame is arranged to abut said mounting shoulder when said secondary frame is engaged to said mounting frame.

14. The vehicle door assembly recited in claim 13, wherein said secondary frame includes a mounting edge extending from said internal end, said mounting edge arranged to rest on an external surface of said body-in-white when said secondary frame is engaged to said mounting frame within said body-in-white, wherein said mounting edge is arranged to contour to said external surface of said body-in-white.

15. The vehicle door assembly recited in claim 12, wherein said secondary frame further comprises a flange, said flange extending from said frame, said flange further arranged to accept a plurality of bolts to secure said secondary frame to said body-in-white.

16. The vehicle door assembly recited in claim 12 further comprising a cutout arranged on a lower section of said door assembly, wherein said cutout is disposed within said frame aperture of said wheel-well and further arranged to provide clearance of a wheel within said wheel-well.

17. The vehicle door assembly recited in claim 16, wherein said cutout comprises:
a first cutout arranged on a lower section of said mounting frame; and,
a second cutout arranged on a lower section of said secondary frame,
wherein said first cutout and said second cutout are collinearly arranged.

18. The vehicle door assembly recited in claim 12, further arranged to accept a door therein.

* * * * *